United States Patent
Kim et al.

(10) Patent No.: US 9,967,039 B2
(45) Date of Patent: May 8, 2018

(54) TRANSCEIVER FOR HUMAN BODY COMMUNICATION AND WIRELESS COMMUNICATION AND OPERATING METHOD THEREOF

(71) Applicant: Electronics and Telecommunications Research Institute, Daejeon (KR)

(72) Inventors: Sung Eun Kim, Daejeon (KR); Tae Wook Kang, Daejeon (KR); Kwang Il Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/347,688

(22) Filed: Nov. 9, 2016

(65) Prior Publication Data

US 2017/0180059 A1 Jun. 22, 2017

(30) Foreign Application Priority Data

Dec. 17, 2015 (KR) .......................... 10-2015-0181121
May 23, 2016 (KR) .......................... 10-2016-0062990

(51) Int. Cl.
| H04B 13/00 | (2006.01) |
| H04W 72/04 | (2009.01) |
| H04L 5/00 | (2006.01) |
| H04W 4/00 | (2018.01) |

(52) U.S. Cl.
CPC ......... *H04B 13/005* (2013.01); *H04L 5/0048* (2013.01); *H04W 4/005* (2013.01); *H04W 72/0453* (2013.01)

(58) Field of Classification Search
CPC ............................ H04B 13/005; H04L 5/0048
See application file for complete search history.

(56) References Cited

U.S. PATENT DOCUMENTS

| 8,340,158 B2 | 12/2012 | Lim et al. |
| 8,467,431 B2 | 6/2013 | Park et al. |
| 2010/0094159 A1 | 4/2010 | Hwang et al. |
| 2010/0246643 A1* | 9/2010 | Lim ........................ H04B 1/69 375/147 |
| 2015/0056921 A1* | 2/2015 | Schwartz .............. H04W 52/42 455/41.2 |

FOREIGN PATENT DOCUMENTS

| KR | 10-2006-0117451 A | 11/2006 |
| KR | 10-0790367 B1 | 1/2008 |
| KR | 10-0829865 B1 | 5/2008 |
| KR | 10-2009-0062486 A | 6/2009 |
| KR | 10-2014-0118289 A | 10/2014 |

* cited by examiner

*Primary Examiner* — Ross Varndell (57) ABSTRACT

A transceiver includes a transmission module for generating an output signal, a controller for controlling the transmission module to allow an output signal to have one of a first frequency and a second frequency, a reception module for controlling the controller to allow a control signal to be outputted based on completion information received from the outside. The transmission module outputs an output signal having a first frequency to perform human body communication. When the reception module receives completion information, the transmission module outputs an output signal having a second frequency in response to the control signal in order to perform wireless communication. The first frequency is lower than the second frequency.

13 Claims, 10 Drawing Sheets

TRANSCEIVER FOR HUMAN BODY COMMUNICATION AND WIRELESS COMMUNICATION AND OPERATING METHOD THEREOF

CROSS-REFERENCE TO RELATED APPLICATIONS

The patent application claims priority under 35 U.S.C. § 119 of Korean Patent Application Nos. 10-2015-0181121, filed on Dec. 17, 2015, and 10-2016-0062990, filed on May 23, 2016, the entire contents of which are hereby incorporated by reference.

TECHNICAL FILED

The present disclosure herein relates to a human body electronic device, and more particularly, to a transceiver for selectively performing human body communication and wireless communication and an operating method thereof.

DESCRIPTION OF THE RELATED ART

Human body communication uses a human body having conductivity as a communication channel. Data is transmitted using a transmitter connected to one part of a human body. The transmitted data is restored using a receiver that is connected to another part of the human body or disposed at the outside of the human body. When human body communication is used, communication between portable devices or communication between a fixed device and a user may be performed through a user's contact. For example, communication between a personal portable information terminal such as a personal digital assistant (PDA), a portable computer, a digital camera, an MP3 player, and a mobile phone may be performed through a user's contact. A printer, a credit card payment, TV reception, an access system, or a transportation fee payment at the time of boarding may be performed through a user's contact. As communication is performed through contact, an intuitive service is possible. And, as signals are transmitted through a human body, excellent security is provided.

In relation to a human body, the transfer characteristics of electricity or radio waves are determined according to the electrical characteristics of tissues constituting a human body, that is, permittivity and conductivity. Accordingly, it is difficult for a receiver disposed at an arbitrary position of a human body to receive accurate radio waves from a transmitter. Radio waves delivered through a human body lose more energy than radio waves delivered through air. Since a human body has conductivity, it is easy for the human body to receive interference signals from a surrounding environment. Additionally, human body communication certainly requires contact between a human body and devices.

Wireless communication refers to a communication technique for delivering information by using radio waves without connection by a line. Wireless communication may include Microwave transmission technology, technology, mobile communication technology, short-range wireless communications technology, Wireless Access Vehicle Environment (WAVE) communication technology, Long Term Evolution (LTE) communication, Very High Frequency (VHF) communication, and satellite communication technology. Wireless communication does not require an additional contact between devices or between a device and a human body.

However, since wireless communication delivers communication signals through air, security is weak. And, wireless communication requires an additional setting for pairing between devices. For example, in order to perform pairing such as Bluetooth, a device selects another device for pairing after scanning.

SUMMARY

The present disclosure provides a transceiver for selectively performing human body communication and wireless communication and an operating method thereof.

In some example embodiments, a transceiver includes: a reception module configured to receive completion information from an external device and output a driving signal in response to the completion information; a controller configured to receive the driving signal from the reception module and output a control signal in response to the driving signal; and a transmission module configured to communicate with the external device through human body communication or wireless communication, wherein the transmission module provides a first output signal having a first frequency to the external device through the human body communication and when receiving the control signal, provides a second output signal having a second frequency to the external device through the wireless communication.

In some example embodiments, the transmission module may include: a comparator configured to compare a reference signal and a feedback signal and generate a clock signal based on the comparison result; a charge pump configured to raise or lower the reference voltage based on the clock signal outputted from the comparator; an oscillator configured to generate the first or second output signal oscillated in response to the reference voltage outputted from the charge pump; and a divider configured to generate the feedback signal by dividing a frequency of the first or second output signal generated from the oscillator, based on a first division ratio, wherein when the divider receives the control signal, the first division ratio of the divider may be changed into a second division ratio; the divider may generate the feedback signal by dividing the frequency of the first or second output signal, based on the second division ratio; and the second division ratio may have a smaller value than the first division ratio.

In some example embodiments, the transceiver may perform the human body communication as providing the first output signal having the first frequency to the external device by using a human body as a communication channel.

In some example embodiments, the transceiver may perform the wireless communication as radiating the second output signal having the second frequency to the outside of a human body.

In some example embodiments, the first frequency may be lower than the second frequency.

In some example embodiments, the transmission module may provide one of pairing information and personal authentication information to the external device through the first output signal having the first frequency, and provide data to the external device through the second output signal having the second frequency.

In some example embodiments, the completion information may be generated in response to one of the pairing information and the personal authentication information.

In some example embodiments, the transceiver may further include a memory configured to store the pairing information, the personal authentication information, and the data.

In some example embodiments, a transceiver includes: a reception module configured to receive completion information from an external device and output a driving signal in response to the completion information; a controller configured to receive the driving signal from the reception module and output a control signal in response to the driving signal; and a transmission module configured to communicate with the external device through human body communication or wireless communication, wherein the transmission module provides a first output signal having a first frequency band to the external device through the human body communication, and when receiving the control signal from the controller, stops an output of the first output signal and provides a second output signal having a second frequency band to the external device through the wireless communication; and the second frequency band is greater than the first frequency band.

In some example embodiments, the transmission module may include: a comparator configured to compare a reference signal and a feedback signal and generate a clock signal based on the comparison result; a charge pump configured to raise or lower the reference voltage based on the clock signal outputted from the comparator; a first oscillator configured to generate the first output signal oscillated within the first frequency band in response to the reference voltage outputted from the charge pump; a second oscillator configured to generate the second output signal oscillated within the second frequency band in response to the reference voltage outputted from the charge pump; a selector configured to connect one of the first oscillator and the second oscillator to the charge pump in response to the control signal; and a divider configured to generate the feedback signal by dividing a frequency of the first or second output signal outputted from one of the first oscillator and the second oscillator based on a division ratio.

In some example embodiments, he control signal may be a first control signal and the controller may further output a second control signal for controlling the division ratio of the divider.

In some example embodiments, the divider may generate the feedback signal by dividing the frequency of the output signal outputted from one of the first oscillator and the second oscillator, based on a first division ratio; when the divider receives the second control signal, the first division ratio of the divider may be changed into a second division ratio; and the divider may generate the feedback signal by dividing the frequency of the output signal outputted from one of the first oscillator and the second oscillator, based on the second division ratio, wherein the second division ration may have a smaller value than the first division ratio.

In some example embodiments, operating method of a transceiver includes: outputting, by a transmission module of the transceiver, an output signal having a frequency in a first frequency band in order to transmit one of personal authentication information and pairing information to an external device through a human body; receiving, by a reception module of the transceiver, completion information generated based on one of the personal authentication information and the pairing information, from the external device; when the completion information is received from the external device, changing, by a processor of the transceiver, a frequency band of the output signal into a second frequency band; and outputting the output signal to the external device, by the transmission module of the transceiver, by radiating the output signal having a frequency in the second frequency band to the outside of the human body, wherein the first frequency band is lower than the second frequency band.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, embodiments of the inventive concept are described in more detail with reference to the accompanying drawings. Various modifications are possible in various embodiments of the present disclosure and specific embodiments are illustrated in drawings and related detailed descriptions are listed. However, this does not limit various embodiments of the inventive concept to a specific embodiment and it should be understood that the inventive concept covers all the modifications, equivalents, and/or replacements of this disclosure provided they come within the scope of the appended claims and their equivalents.

Like reference numerals refer to like elements throughout the drawings. In the accompanying drawings, the dimensions of components are enlarged than they actually are for the clarity of the inventive concept.

It will be understood that the terms "first" and "second" are used herein to describe various components but these components should not be limited by these terms. These terms are used only to distinguish one component from other components. For example, a first component may be referred to as a second component and vice versa without departing from the scope of the inventive concept. The expressions in a singular form may include a plural form unless they have a clearly different meaning in the context.

Additionally, in various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components. Additionally, it will be understood that when a portion such as a layer, a film, an area, and a plate is referred to as being 'on' another portion, it can be directly on the other portion, or an intervening portion can also be present. On the other hand, it will be understood that when a portion such as a layer, a film, an area, and a plate is referred to as being 'below' another portion, it can be directly below the other portion, or an intervening portion can also be present.

Figure 1:
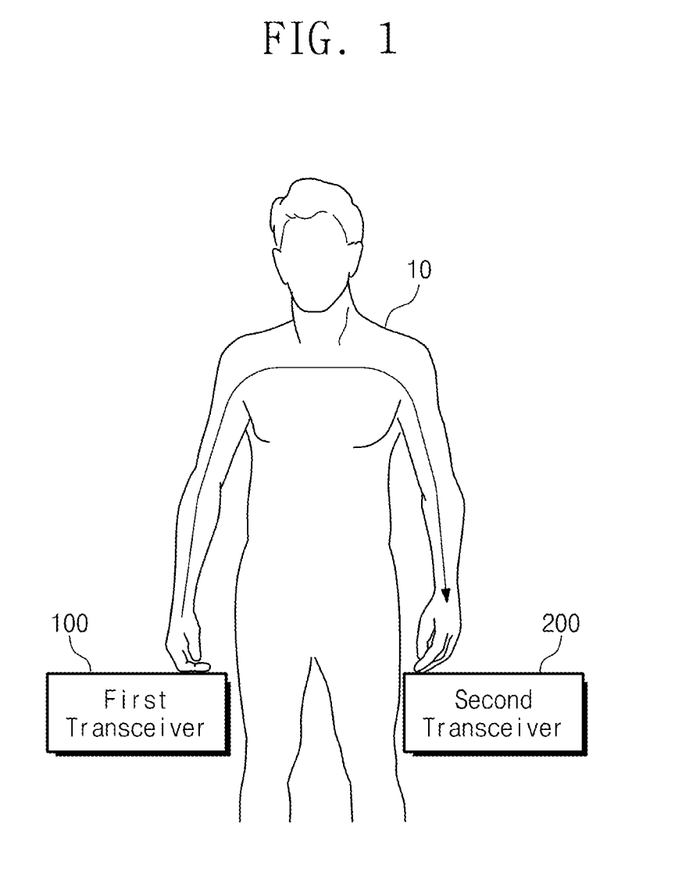
FIG. 1 is a view illustrating a human body communication method according to an embodiment of the inventive concept.

FIG. 1 is a view illustrating a human body communication method according to an embodiment of the inventive concept. A technique for transmitting/receiving data by using a human body 10 as a medium may be referred to as human body communication. Referring to FIG. 1, a first transceiver 100 and a second transceiver 200 may transmit/receive data by using the human body 10 as a medium.

Human body communication uses the human body 10 having conductivity as a communication channel. In more detail, human body communication refers to a technique for delivering data by using the human body 10 as a channel between the first transceiver 100 and the second transceiver 200, which contact the human body 10. Each of the first transceiver 100 and the second transceiver 200 may be implemented in at least one electronic device of a personal digital assistant (PDA), a smartphone, a portable personal computer, a digital camera, a printer, a wearable device, a tablet computer, mobile device, and television (TV). The first transceiver 100 and the second transceiver 200 may be implemented in various types of electronic devices in addition to the above-mentioned electronic devices. In such a way, human body communication may provide network between the first transceiver 100 and the second transceiver 200 through a simple contact of the human body 10.

In order to perform human body communication, the first transceiver 100 and the second transceiver 200 may transmit/receive data by using signals in a low frequency band (for example, less than 1 MHz). Signals in a low frequency band are drastically decreased according to a distance change. Accordingly, signals in a low frequency band may not be radiated to the outside of the human body 10. Since the first transceiver 100 and the second transceiver 200 are spaced the length of the human body 10 from each other, short-range communication may be performed using signals in a low frequency band.

Since signals in a low frequency band have a slow transfer rate, they are not appropriate to transmit/receive large amounts of data. Accordingly, the first transceiver 100 and the second transceiver 200 may transmit/receive pairing information and personal authentication information. At this point, pairing information and personal authentication information may include a small amount of data.

Figure 2:
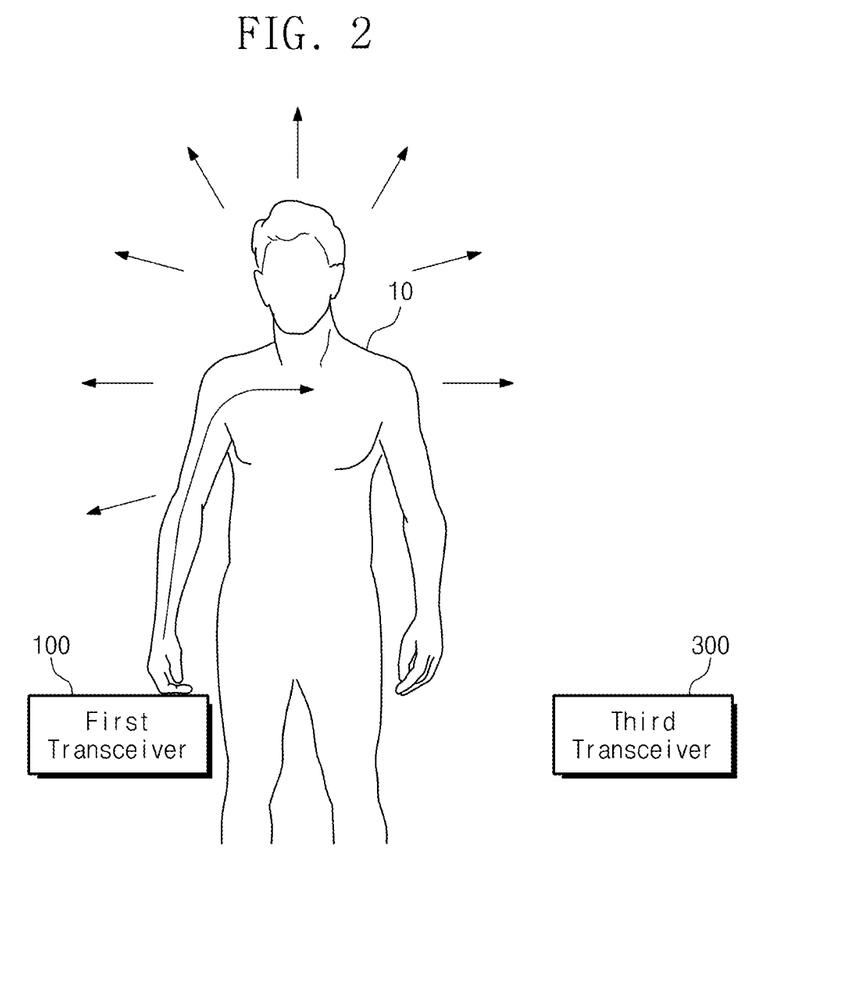
FIG. 2 is a view illustrating a wireless communication method using a human body as an antenna according to an embodiment of the inventive concept.

FIG. 2 is a view illustrating a wireless communication method using a human body as an antenna according to an embodiment of the inventive concept. A first transceiver 100 and a third transceiver 300 may perform wireless communication. The first transceiver 100 shown in FIG. 2 may be similar or identical to the first transceiver 100 shown in FIG. 1. The third transceiver 300 may be implemented in at least one electronic device of a PDA, a smartphone, a laptop, a digital camera, a printer, a tablet computer, a mobile device, a wearable device, and a TV. The third transceiver 300 may be implemented in various types of electronic devices in addition to the above-mentioned electronic devices. Then, the second transceiver 200 and the third transceiver 300 may be included in the same electronic device.

In order to transmit data to the third transceiver 300, the first transceiver 100 may transmit signals by using the human body 10 as an antenna. Signals radiated from the first transceiver 100 may be radiated to air through the human body 10. The third transceiver 300 may be provided spaced more than a predetermined distance from the human body 10. Accordingly, in order for signals radiated from the first transceiver 100 to reach the third transceiver 300, the signals may be in a high frequency band (for example, more than 10 MHz).

Since signals in a high frequency band have a fast transfer rate, they may transmit large amounts of data. Accordingly, the first transceiver 100 may transmit a large amount of data to the third transceiver 300.

Referring to FIGS. 1 and 2, the first transceiver 100 may perform human body communication with the second transceiver 200 by using signals in a low frequency band. The first transceiver 100 may transmit pairing information or personal authentication information to the second transceiver 200 through human body communication. Then, the first transceiver 100 may perform wireless communication with the third transceiver 300 by using signals in a high frequency band. The first transceiver 100 may transmit/receive data to/from the third transceiver 300 through wireless communication. Detailed structures and data transmitting/receiving methods of the first to third transceivers 100 to 300 are described with reference to FIGS. 3 to 9.

Figure 3:
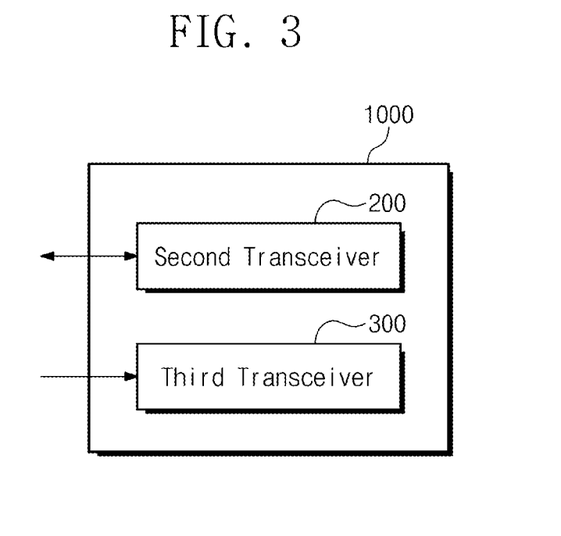
FIG. 3 is a block diagram illustrating an electronic device including a second transceiver and a third transceiver.

FIG. 3 is a block diagram illustrating an electronic device including a second transceiver and a third transceiver. Referring to FIGS. 1 to 3, the second transceiver 200 and the third transceiver 300 may be included in one electronic device 1000. The electronic device 1000 may be implemented as at least one of a PDA, a smartphone, a portable personal computer, a digital camera, a printer, a tablet computer, a mobile device, a wearable device, and a TV. Additionally, the electronic device 1000 may be various types of electronic devices in addition to the above-mentioned electronic devices.

The electronic device 1000 may receive signals in a low frequency band (for example, less than 1 MHz) from the first transceiver 100 through the second transceiver 200. Signals in a low frequency band may be transmitted through a human body. The electronic device 1000 may perform a pairing operation or a personal authentication operation by using signals in a low frequency band. When completing a pairing operation or a personal authentication operation, the electronic device 1000 may transmit completion information to the first transceiver 100 through the second transceiver 200.

Then, the electronic device 1000 may receive signals in a high frequency band (for example, more than 10 MHz) from the first transceiver 100 through the third transceiver 300. Signals in a high frequency band may be radiated to the outside of a human body and transmitted. The electronic device 1000 may receive data through signals in a high frequency band. In such a way, the electronic device 1000 may perform human body communication and wireless communication with an external device (for example, the first transceiver 100) by using the second transceiver 200 and the third transceiver 300.

Figure 4:
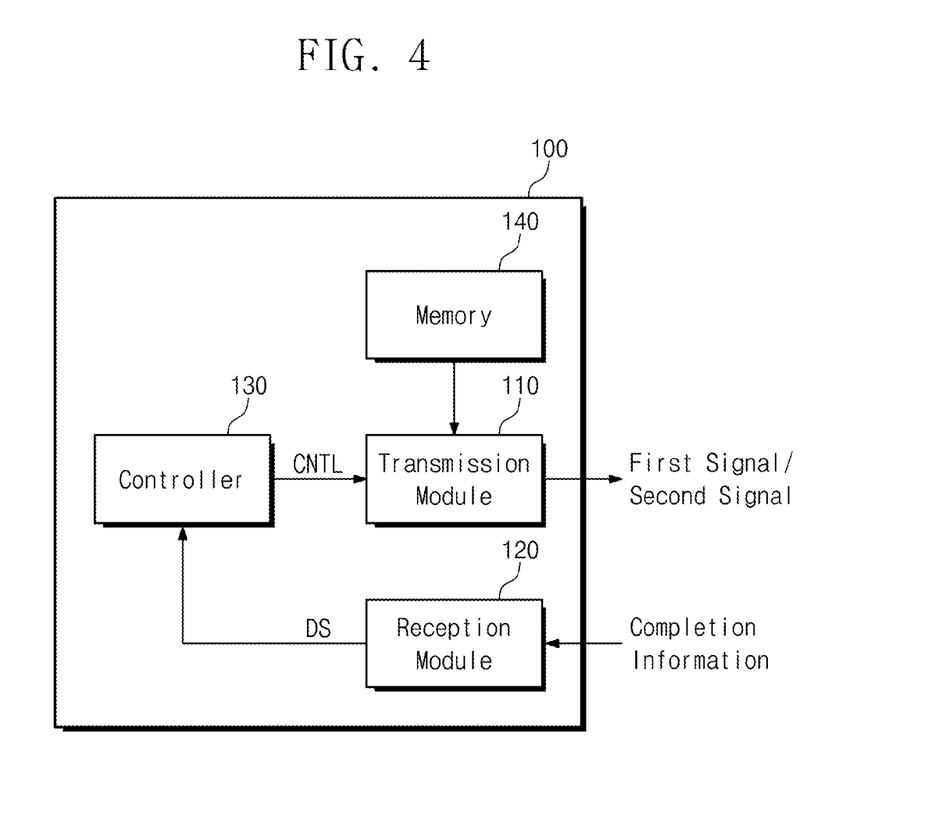
FIG. 4 is a block diagram illustrating a transceiver according to an embodiment of the inventive concept.

FIG. 4 is a block diagram illustrating a transceiver according to an embodiment of the inventive concept. A first transceiver 100 shown in FIG. 4 may be similar or identical to the first transceiver 100 shown in FIGS. 1 and 2. Referring to FIGS. 1 to 4, the first transceiver 100 may include a transmission module 110, a reception module 120, and a controller 130.

The transmission module 110, the reception module 120, and the controller 130 may be implemented in a hardware form, a software form, or a hybrid form.

In the hardware form, each of the transmission module 110, the reception module 120, and the controller 130 may include at least one digital and/or analog circuit in order to perform operations described below. In the software form, each of the transmission module 110, the reception module 120, and the controller 130 may include at least one instruction code configured to perform operations described below. The instruction code may be complied or interpreted as an instruction set and processed through at least one processor.

The transmission module 110 may output a first signal or a second signal. The transmission module 110 may output the first signal to perform human body communication. Then, when receiving a control signal CNTL, the transmission module 110 may adjust a frequency of the first signal or the second signal. A structure of the transmission module 110 will be described in detail with reference to FIGS. 5 and 7.

The reception module 120 may receive completion information from the outside. In more detail, the reception module 120 may receive pairing completion information or personal authentication completion information from the second transceiver 200. When receiving the completion information, the reception module 120 may output a driving signal DS to drive the controller 130.

The controller 130 may be driven by the driving signal DS received from the reception module 120. Based on the driving signal DS, the controller 130 may output the control signal CNTL. The control signal CNTL is a signal for controlling a frequency of the first signal or the second signal.

A memory 140 may be a non-volatile memory. The non-volatile memory may include at least one of Read Only Memory (ROM), Programmable ROM (PROM), Electrically Programmable ROM (EPROM), Electrically Erasable and Programmable ROM (EEPROM), flash memory, Phase-change RAM (PRAM), Magnetic RAM (MRAM), Resistive RAM (RRAM), and Ferroelectric RAM (FRAM). The memory 140 may store pairing information, personal authentication information, and data. The memory 140 may provide the stored information to the transmission module 110.

The second transceiver 200 and the third transceiver 300 shown in FIGS. 1 and 2 may have a similar or same structure as that shown in FIG. 3.

Figure 5:
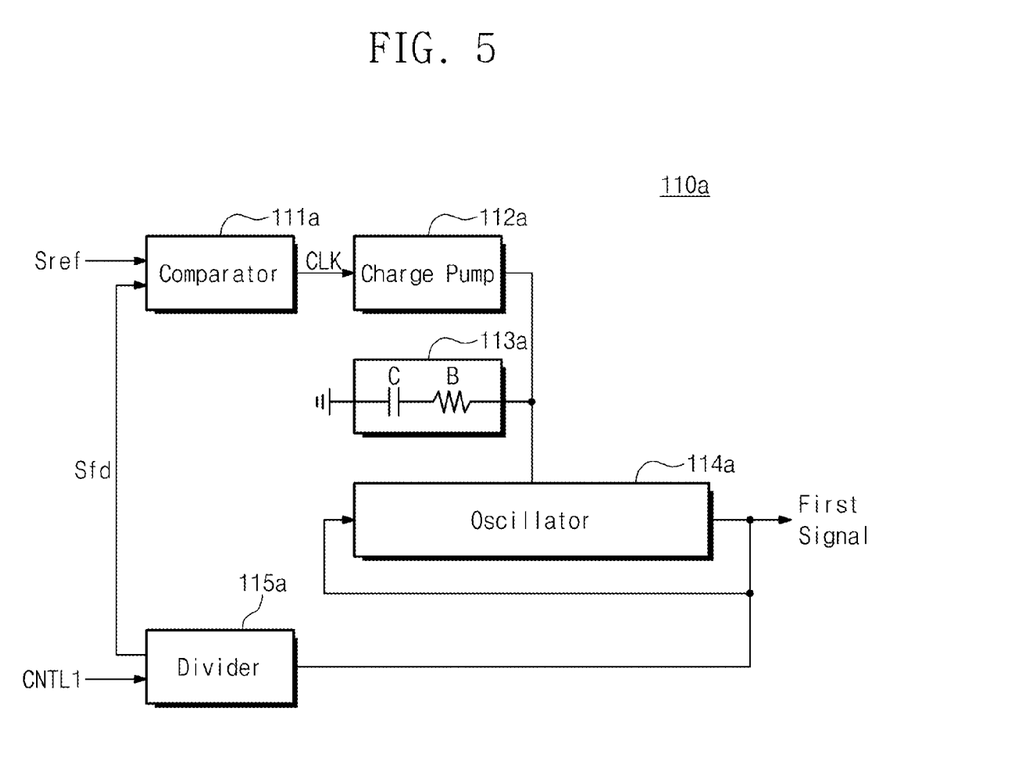
FIG. 5 is a circuit diagram illustrating one example of a transmission module shown in FIG. 4.

FIG. 5 is a circuit diagram illustrating one example of a transmission module shown in FIG. 4. A first transmission module 110a of FIG. 5 is one example of the transmission module 110 of FIG. 4. Referring to FIG. 5, the first transmission module 110a may include a comparator 111a, a charge pump 112a, a loop filter 113a, an oscillator 114a, and a divider 115a.

The comparator 111a may receive a reference signal Sref and a feedback signal Sfb that is a frequency received from the divider 115a. The comparator 111a may be a phase detector. The comparator 111a may compare a difference of phases or frequencies between each frequency of the reference signal Sref and the feedback signal Sfb. If there is a phase or frequency difference between frequencies of the reference signal Sref and the feedback signal Sfb, the comparator 111a may generate a clock signal CLK corresponding to the phase or frequency difference.

The clock signal CLK generated by the comparator 111a will be described in detail with reference to FIG. 6.

Figure 6:
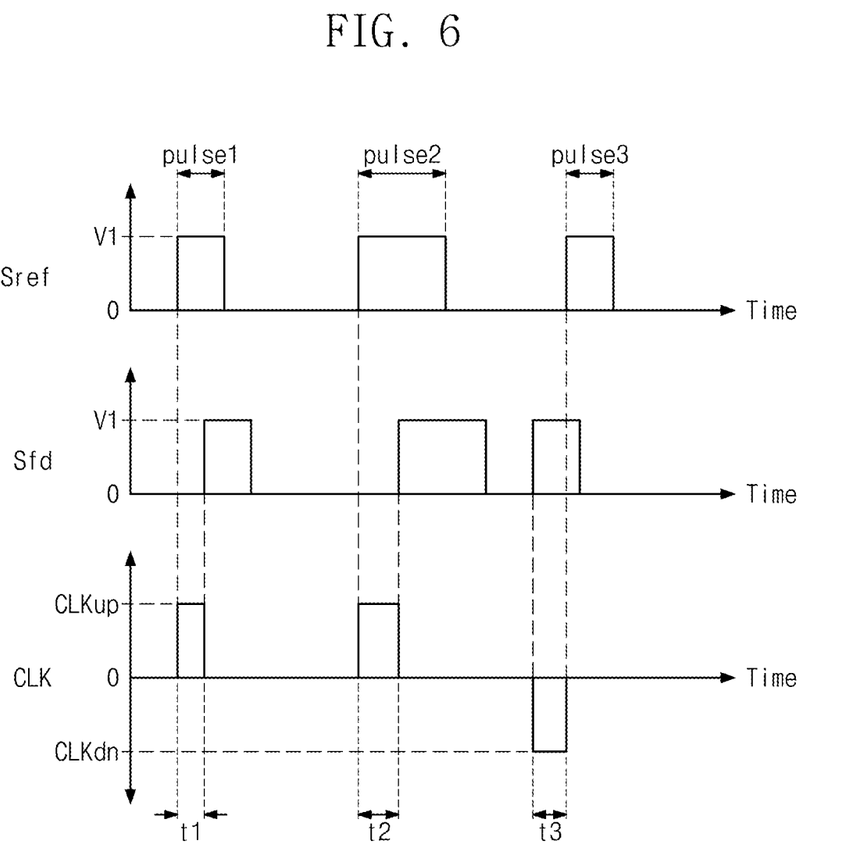
FIG. 6 is a graph illustrating a reference signal, a feedback signal, and a clock signal.

FIG. 6 is a graph illustrating a reference signal Sref, a feedback signal Sfd, and a clock signal CLK. The horizontal axis of the graph corresponding to each of the reference signal Sref, the feedback signal Sfd, and the clock signal CLK may represent a time and the vertical axis may represent the voltage size of a signal.

Referring to FIGS. 5 and 6, the reference signal Sref and the feedback signal Sfd may be applied to the comparator 111a during a first pulse pulse1. The first pulse pulse1 may be a time at which the reference signal Sref and the feedback signal Sref are applied first. The reference signal Sref may be applied to the comparator 111a and after a delay by a first time t1, the feedback signal Sfd may be applied to the comparator 111a. At this point, the comparator 111a may generate a clock signal CLK having a positive value during the first time t1.

Then, the reference signal Sref and the feedback signal Sfd may be applied to the comparator 111a during a second pulse pulse2. The second pulse pulse2 may be a time at which the reference signal Sref and the feedback signal Sref are applied second. The reference signal Sref may be applied to the comparator 111a and after a delay by a second time t2, the feedback signal Sfd may be applied to the comparator 111a. At this point, the comparator 111a may generate a clock signal CLK having a positive value during the second time t1. At this point, the clock signal CLK having a positive value may be an up signal CLKup.

Lastly, the reference signal Sref and the feedback signal Sfd may be applied to the comparator 111a during a third pulse pulse3. The third pulse pulse3 may be a time at which the reference signal Sref and the feedback signal Sref are applied third. The reference signal Sref may be applied to the comparator 111a and after a delay by a third time t3, the feedback signal Sfd may be applied to the comparator 111a. At this point, the comparator 111a may generate a clock signal CLK having a negative value during the third time t3. At this point, the clock signal CLK having a negative value may be a down signal CLKdn.

The charge pump 112a may receive the clock signal CLK from the comparator 111a. The charge pump 112a may raise or lower voltage based on the applied time and code of the clock signal CLK. In some embodiments, the charge pump 112a may include a capacitor for raising or lowering voltage.

When an up signal CLKup is applied to the charge pump 112a, the charge pump 112a may raise voltage. In more detail, while the up signal CLKup is applied, the charge pump 112a may accumulate charges in a capacitor. As accumulating charges, the charge pump 112a may raise voltage.

On the other hand, when a down signal CLKdn is applied to the charge pump 112a, the charge pump 112a may lower voltage. In more detail, while the down signal CLKdn is applied, the charge pump 112a may discharge the charges of a capacitor. As discharging charges, the charge pump 112a may lower voltage.

The loop filter 113a may be connected between the charge pump 112a and the oscillator 114a. The loop filter 113a may include a resistor R and a capacitor C. The resistor R and the capacitor C may be connected in parallel. In detail, one end of the resistor R may be connected between the charge pump 112a and the oscillator 114a and the other end may be connected to one end of the capacitor C. Additionally, the other end of the capacitor C may be connected to the ground terminal.

The loop filter 113a may remove a high frequency component of a voltage outputted from the charge pump 112a. In some embodiments, the loop filter 113a may be a low pass filter. A voltage having a high frequency component removed may be delivered to the oscillator 114a.

The oscillator 114a may receive the clock signal CLK having a high frequency component removed. The oscillator 114a may be a voltage controlled oscillator (VCO). The oscillator 114a may generate a first signal having a frequency that varies based on the voltage size of the clock signal CLK. A frequency band (for example, 1 MHz to 10 MHz) controlled by the oscillator 114a is limited. The oscillator 114a may change a frequency of the first signal within a predetermined frequency band and output the first signal to the outside.

The divider 115a may be connected between the comparator 111a and the oscillator 114a. The divider 115a may receive the first signal. The divider 115a may adjust a frequency of the first signal. In detail, the divider 115a may adjust a frequency of the first signal in order to generate the feedback signal Sfd compared to the reference signal Sref. The divider 115a may lower a frequency of the first signal based on a set division ratio. The divider 115a may output the feedback signal Sfd having a lowered frequency, that is, the divided first signal, to the comparator 111a. The divider 115a may divide the first signal into 1/N. At this point, 1/N is a division ratio.

In some embodiments, when the first transceiver 100 performs human body communication, the first transmission module 110a may output a first signal of a low frequency (for example, less than 1 MHz). If the frequency size of the reference signal Sref is 1 MHz and a frequency of a signal (for example, the first signal) necessary for human body communication is 1 MHz, a division ratio of the divider 115a may be '1'. If the division ratio of the divider 115a is '1', the frequency size of the first signal may be 1 MHz.

Referring to FIGS. 1, 4, and 5, when human body communication is completed between the first transceiver 100 and the second transceiver 200, the reception module 120 may receive completion information from the second transceiver 200. When receiving the completion information, the reception module 120 may apply the driving signal DS to the controller 130. When receiving the driving signal DS, the controller 130 may output a first control signal CNTL1 to the divider 115a. The first control signal CNTL1 according to an embodiment of the inventive concept may be a signal for changing a division ratio of the divider 115a. In more detail, when the division ratio of the divider 115a is changed by the first control signal CNTL1, the first transceiver 100 may perform wireless communication.

In some embodiments, when the divider 115a receives the first control signal CNTL1, the division ratio may be adjusted to 1/10. If the division ratio is 1/10, a frequency of the feedback signal Sfd may be reduced by 1/10 of a frequency of the first signal. Exemplarily, when a frequency of the first signal is 1 MHz, a frequency of the feedback signal Sfd may be adjusted to 0.1 MHz.

The comparator 111a may compare the frequency sizes of the reference signal Sref and the feedback signal Sfb. The comparator 111a may output the clock signal CLK corresponding to a frequency size difference to the charge pump 112a. Exemplarily, the comparator 111a may output an up signal CLKup.

Based on the length of a time at which the up signal CLKup is applied, the charge pump 112a may raise voltage. The oscillator 114a may generate a first signal oscillated based on the size of the raised voltage. Exemplarily, the frequency size of the first signal may be 10 MHz. When the frequency size of the first signal becomes 10 MHz, a frequency of the feedback signal Sfd generated through the first divider 115a may be 1 MHz. Accordingly, since the frequency sizes of the reference signal Sref and the feedback signal Sfd applied to the comparator 111a are the same, the clock signal CLK is not generated and a frequency of the first signal may be maintained at 1 MHz.

Referring to FIGS. 4 and 5, a division ratio of the divider 115a may be controlled by the first control signal CNTL1 received from the controller 130. In some embodiments, in order for the first transceiver 100 to perform wireless communication, a division ration of the divider 115a may be reduced. When the division ratio is reduced, a frequency of the first signal outputted from the first transmission module 110a of the first transceiver 100 may be increased.

However, a frequency band (for example, 1 MHz to 10 MHz) generated by the oscillator 114a shown in FIG. 5 is limited. In some embodiments, in order to perform human body communication, the first transmission module 100a may output a first signal of a low frequency (for example, less than 1 MHz). Through a first signal of a low frequency (for example, less than 1 MHz), the first transmission module 100a may output pairing information to the second transmission device 200. Once pairing is completed, the first transmission module 100a may output a second signal of a high frequency (for example, 10 MHz) in order to perform wireless communication.

Figure 7:
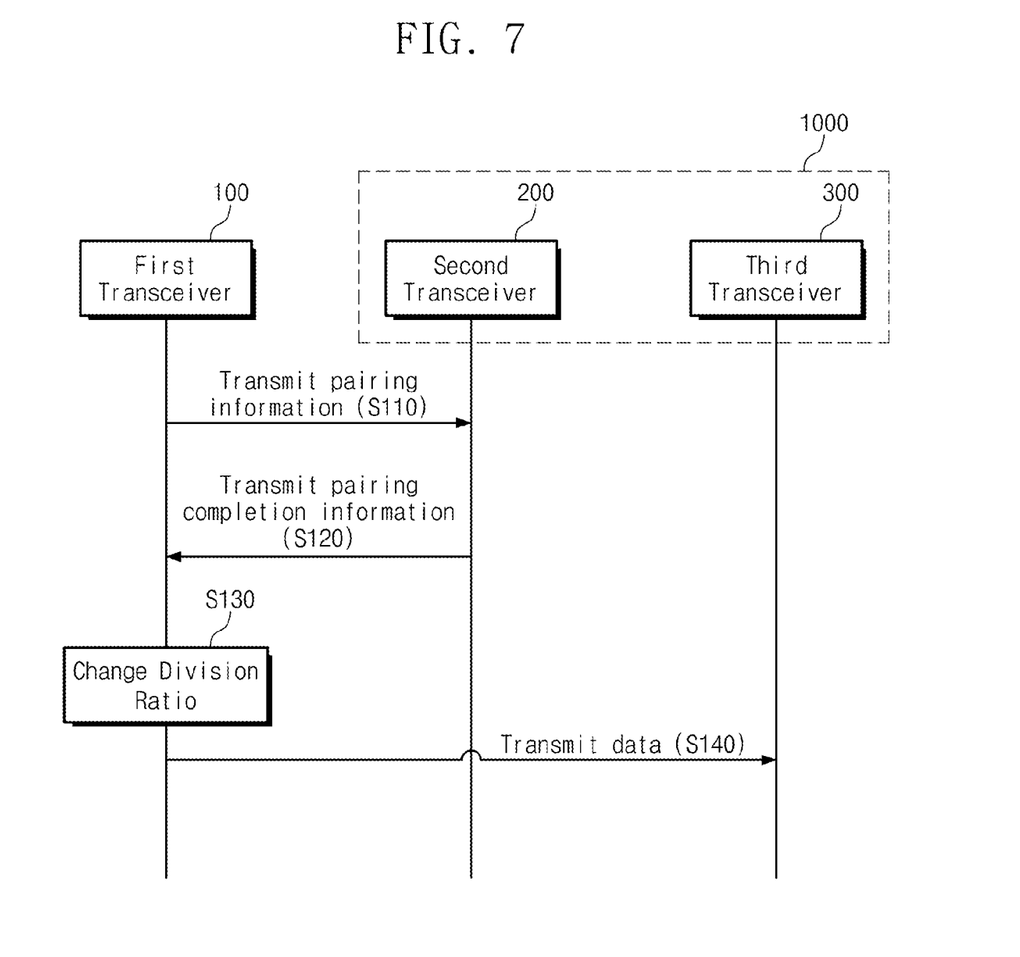
FIG. 7 is a flowchart illustrating a pairing and data transmitting method between a first transceiver and an electronic device.

FIG. 7 is a flowchart illustrating a pairing and data transmitting method between a first transceiver and an electronic device. Referring to FIGS. 3 and 6, for example, the electronic device 1000 may communicate with the first transceiver 100 through the second transceiver 200 and the third transceiver 300. The first transceiver 100 may transmit pairing information to the second transceiver 200 in operation S110. For example, the first transceiver 100 may transmit pairing information through a first signal of a low frequency (for example, 1 MHz). The first transceiver 100 may perform human body communication by using a first signal of a low frequency (for example, 1 MHz).

The second transceiver 200 may receive pairing information. When pairing is completed, the second transceiver 200 may transmit pairing completion information to the first transceiver 100 in operation S120. When receiving the pairing completion information, the first transceiver 100 may change a division ratio of the divider 115a in order to transmit data in operation S130. For example, the first transceiver 100 may change a division ratio of the divider 115a in order to output a first signal of a high frequency (for example, 10 MHz). The first transceiver 100 may perform wireless communication by using a first signal of a high frequency. The first transceiver 100 may transmit data to the third transceiver 300 by using the first signal of the high frequency in operation S140. At this point, the third transceiver 300 may be included in the second transceiver 200. Alternatively, the third transceiver 300 may be a device connected to the second transceiver 200.

Referring to FIGS. 3, 5, and 7, the first transceiver 100 according to an embodiment of the inventive concept may selectively perform human body communication and wireless communication by adjusting a division ratio of the divider 114a. In more detail, the first transceiver 100 may perform human body communication by using the first signal of the low frequency (for example, 1 MHz) and may perform wireless communication by using the first signal of the high frequency (for example, 10 MHz). However, since a frequency band (for example, 1 MHz to 10 MHz) generated by the oscillator 114a is limited, it may be difficult to adjust a frequency of a first signal precisely.

Figure 8:
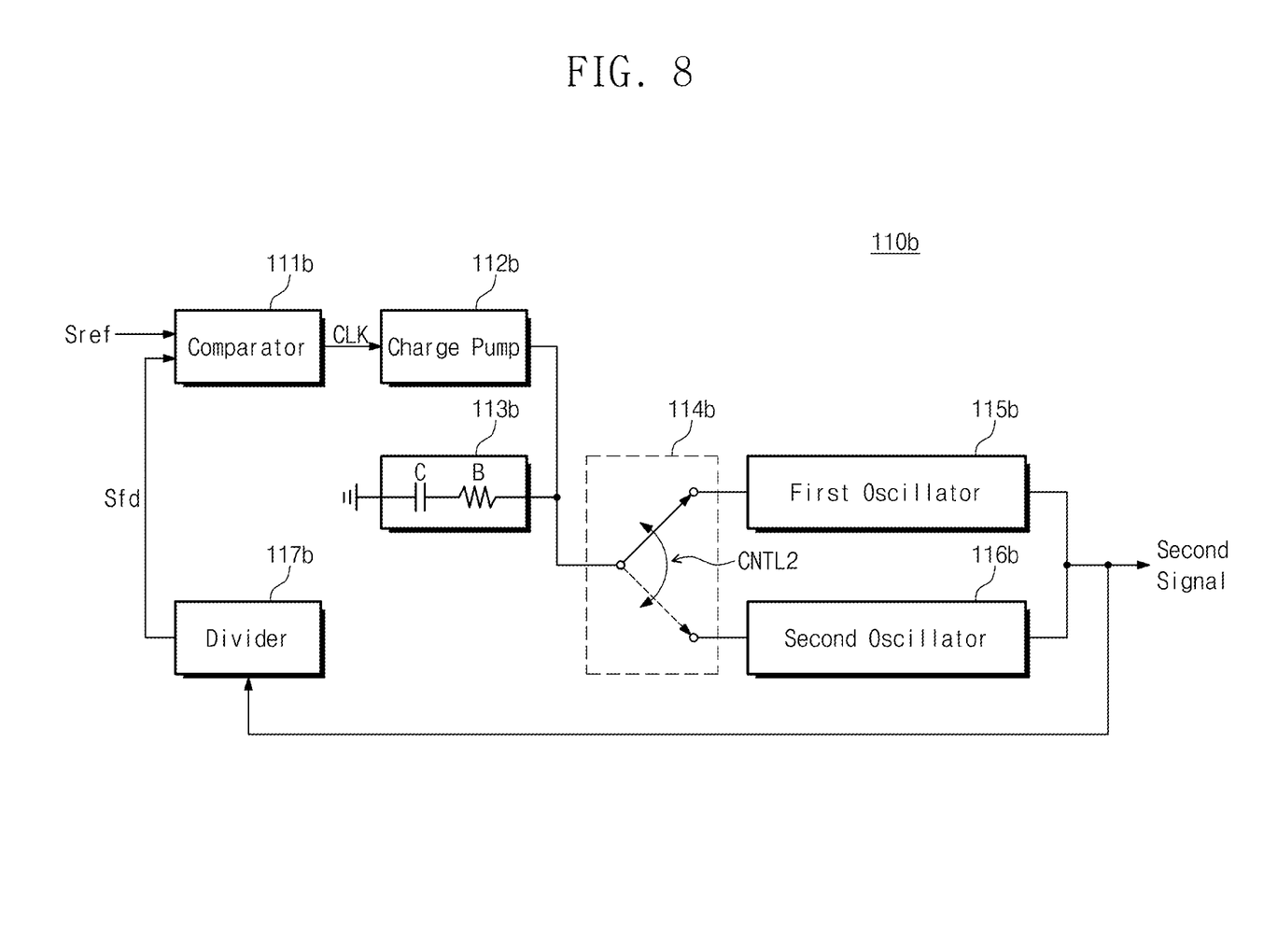
FIG. 8 is a circuit diagram illustrating another example of a transmission module shown in FIG. 4.

FIG. 8 is a circuit diagram illustrating another example of a transmission module shown in FIG. 4. A second transmission module 110b of FIG. 8 is one example of the transmission module 110 of FIG. 4. Referring to FIG. 8, the second transmission module 110b may include a comparator 111b, a charge pump 112b, a loop filter 113b, a selector 114b, a first oscillator 115b, a second oscillator 116b, and a divider 117a. The comparator 111b, the charge pump 112b, and loop filter 113b of FIG. 7 may be similar or identical to the comparator 111a, the charge pump 112a, and the loop filter 113a shown in FIG. 4. Accordingly, detailed descriptions for the comparator 111b, the charge pump 112b, and loop filter 113b are omitted.

The selector 114b may be connected to the charge pump 112b. The selector 114b may be selectively connected to one of the first oscillator 115b and the second oscillator 116b in response to a second control signal CNTL2. Referring to FIG. 3, the second control signal CNTL2 may be a control signal CNTL outputted from the controller 130.

The first oscillator 115b and the second oscillator 116b may generate signals of different frequency bands. The first oscillator 115b may oscillate a signal in a first frequency band (for example, 0.1 MHz to 1 MHz). The first oscillator 115b may generate a signal of a low frequency band. Referring to FIGS. 4 and 7, when the first transceiver 100 performs human body communication, the selector 114 may be connected to the first oscillator 115b. Accordingly, the first oscillator 115b may output a second signal in a first frequency band. The first transceiver 100 may transmit personal authentication information to the second transceiver 200 through a second signal of a first frequency band.

Referring to FIGS. 1, 4, and 8, when human body communication is completed between the first transceiver 100 and the second transceiver 200, the reception module 120 may receive completion information from the second transceiver 200. When receiving the completion information, the reception module 120 may apply the driving signal DS to the controller 130. When receiving the driving signal DS, the controller 130 may output a second control signal CNTL2 to the selector 114b. The selector 114b may be connected to the second oscillator 116b in response to the second control signal CNTL2. When the selector 114b is connected to the second oscillator 116b in response to the second control signal CNTL2, the first transceiver 100 may perform wireless communication.

The second oscillator 116b may oscillate a signal in a second frequency band (for example, 10 MHz to 100 MHz). The second oscillator 116b may generate a signal of a high frequency band. Referring to FIGS. 5 and 8, when the first transceiver 100 is connected to the second oscillator 116b, it may output a second signal in a second frequency band. The first transceiver 100 may transmit data to the third transceiver 300 through a second signal of a second frequency band. The data may include a variety of information that is to be transmitted from the first transceiver 100.

The divider 117b may be connected between the comparator 111b and the first and second oscillators 115b and 116b. The divider 117b is similar or identical to the divider 115a shown in FIG. 4. The divider 117b may receive a first control signal CNTL1 from the controller 130. A division ratio of the divider 117b may be controlled in response to the first control signal CNTL1.

The second transmission module 110b shown in FIG. 8 may adjust a frequency of an outputted signal finely. The second transmission module 110b may select a frequency band of a second signal by selectively connecting to the first oscillator 115b or the second oscillator 116b. Additionally, by adjusting a division ratio of the divider 117b, the second transmission module 110b may adjust a frequency of a second signal finely in the selected frequency band.

Accordingly, the first transceiver 100 including the second transmission module 110b may output a signal having a lower frequency than the first transceiver 100 including the first transceiver 100. For this reason, the first transceiver 100 including the second transmission module 110b may transmit personal authentication information that requires a high security to the second transceiver 200. Alternatively, the first transceiver 100 including the second transmission module 100b may transmit pairing information for performing pairing, to the second transceiver 200.

Figure 9:
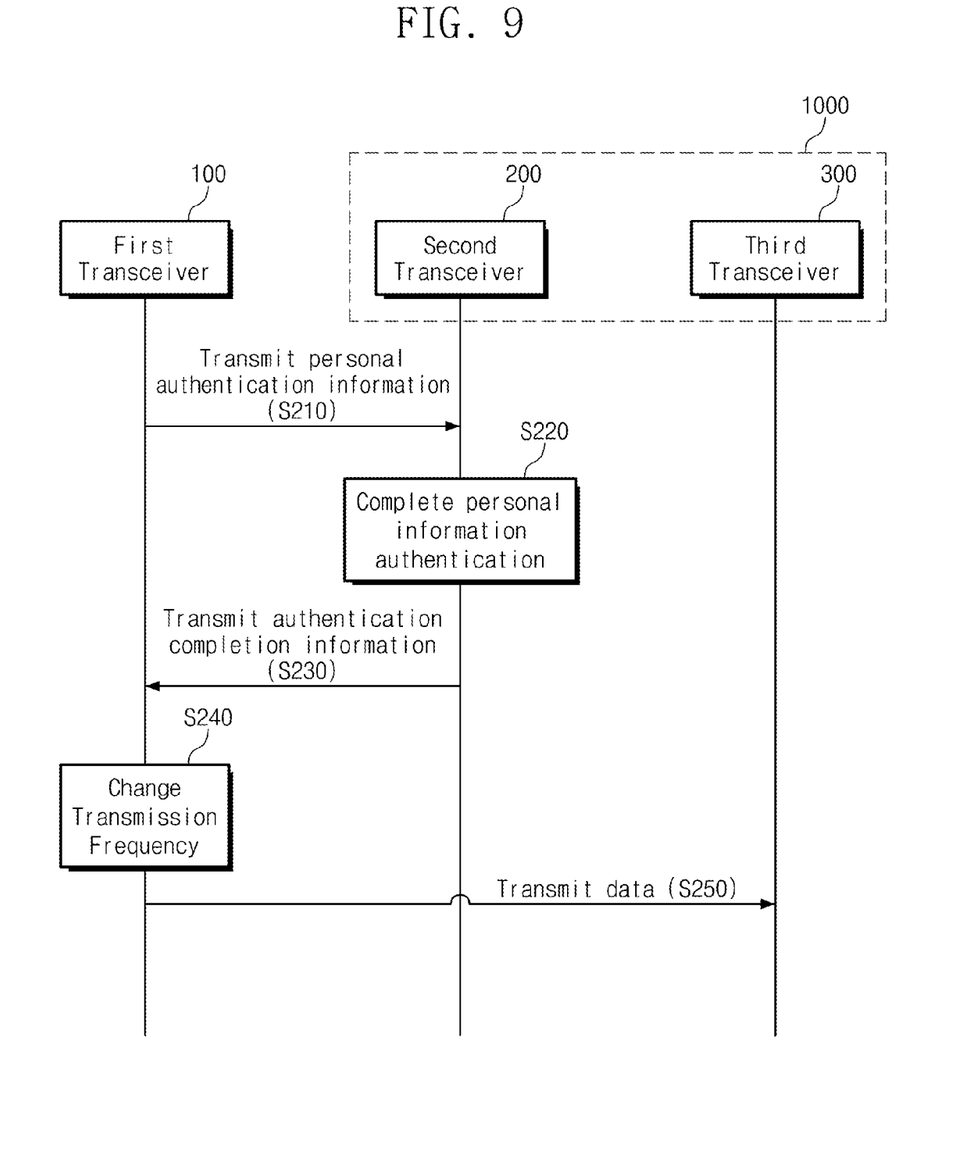
FIG. 9 is a flowchart illustrating a personal information authentication and data transmission method between a transmission device and an electronic device.

FIG. 9 is a flowchart illustrating a personal information authentication and data transmission method between a transmission device and an electronic device. Referring to FIGS. 8 and 9, the first transceiver 100 may transmit personal authentication information to the second transceiver 200 in operation S210. For example, the first transceiver 100 may generate a second signal through the first oscillator 115b that oscillates a signal within a first frequency band (for example, 0.1 MHz to 1 MHz). The second signal generated through the first oscillator 115b may include personal authentication information.

The second transceiver 200 may receive personal authentication information from the first transceiver 100. The second transceiver 200 may complete the personal information authentication in operation S220. The second transceiver 200 may transmit the authentication completion information to the first transceiver 100 in operation S230.

When receiving the authentication completion information, the first transceiver 100 may change a transmission frequency of a second signal in operation S240. In more detail, the selector 114b of the first transceiver 100 may be connected to the second oscillator 116b by the control signal CNTL2. The first transceiver 100 may generate a second signal through the first oscillator 115b that oscillates a signal within a second frequency band (for example, 10 MHz to 100 MHz). The first transceiver 100 may transmit data to the third transceiver 300 in operation S250. For example, the second signal generated through the second oscillator 116b may include data.

Figure 10:
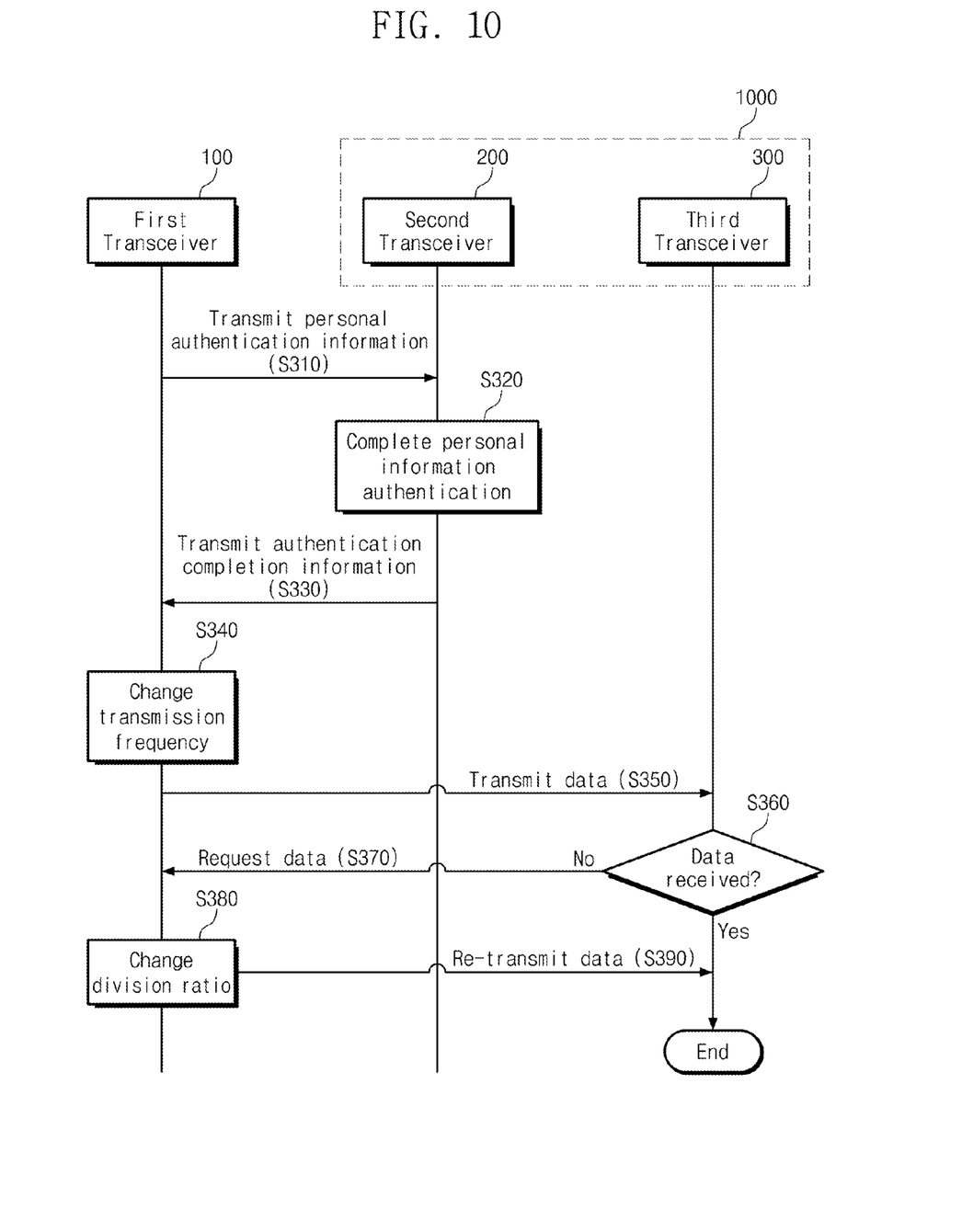
FIG. 10 is a flowchart illustrating a personal information authentication and data transmission method by changing a transmission frequency between a transmission device and an electronic device and changing a division ratio.

FIG. 10 is a flowchart illustrating a personal information authentication and data transmission method by changing a transmission frequency between a transmission device and an electronic device and changing a division ratio. Referring to FIGS. 8 and 10, the first transceiver 100 may transmit personal authentication information to the second transceiver 200 in operation S310. Then, the second transceiver 200 may receive personal authentication information from the first transceiver 100. The second transceiver 200 may complete the personal information authentication in operation S320. The second transceiver 200 may transmit the authentication completion information to the first transceiver 100 in operation S330.

When receiving the authentication completion information, the first transceiver 100 may change a transmission frequency of a second signal in operation S340. The first transceiver 100 may generate a second signal through the first oscillator 115b that oscillates a signal within a second frequency band (for example, 10 MHz to 100 MHz). The first transceiver 100 may transmit data to the third transceiver 300 in operation S350.

The third transceiver 300 may determine whether the data is received in operation S360. If the data is received, data transmission/reception is completed. However, if all or part of the data is not received, the third transceiver 300 may request data from the first transceiver 100 in operation S370

The first transceiver 100 may receive a data request from the third transceiver 300. The first transceiver 100 may change a division ratio in order to re-transmit the data in operation S380. In more detail, the first transceiver 100 may change a division ratio of a divider. The first transceiver 100 may reduce a division ratio of a divider in order to increase a frequency of a second signal. The first transceiver 100 may re-transmit data to the third transceiver 300 by using a second signal with a reduced division ratio in operation S390. Referring to FIGS. 8 and 9, the third transceiver 300 may be included in the second transceiver 200. Alternatively, the third transceiver 300 may be a device connected to the second transceiver 200.

Referring to FIGS. 8 and 9, as the first transceiver 100 including the second transmission module 110b is selectively connected to one of the first oscillator 115b and the second oscillator 116b, it may adjust an output frequency band of a second signal. Additionally, referring to FIGS. 8 and 10, as changing a division ratio of the divider 117b, the first transceiver 100 including the second transmission module 110b may adjust a frequency of a second signal finely.

Figure 11:
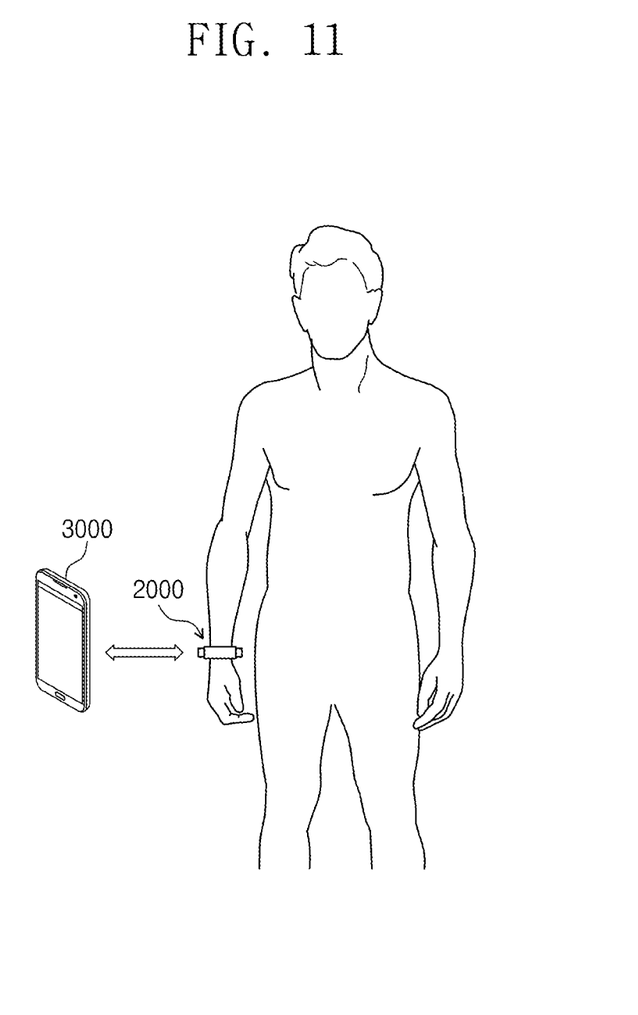
FIG. 11 is a view illustrating one example that a transceiver is applied according to an embodiment of the inventive concept.

FIG. 11 is a view illustrating one example that a transceiver is applied according to an embodiment of the inventive concept. Referring to FIG. 11, it is assumed that the first transceiver 100 is included in a first wearable device 2000 and the second transceiver 200 and the third transceiver 300 are included in a second wearable device 3000. The first wearable device 2000 and the second wearable device 3000 may perform human body communication. Then, the first wearable device 2000 and the second wearable device 3000 may perform wireless communication. A method of performing human body communication and wireless communication is described with reference to FIGS. 1 to 10 so that its detailed description will be omitted.

In some embodiments, while a person contacts the second wearable device 3000, the first wearable device 2000 may perform human body communication with the second wearable device 3000. Through human body communication, the first wearable device 2000 and the second wearable device 3000 may perform pairing or personal information authentication. When pairing or personal information authentication is completed, a person may stop contacting the second wearable device 3000. Then, the first wearable device 2000 and the second wearable device 3000 may transmit data through wireless communication.

Referring to FIGS. 5, 8, and 11, the transceivers 100 to 300 according to an embodiment of the inventive concept may selectively perform human body communication and wireless communication by using one transmission modules 110a or 110b. The transceivers 100 to 300 according to an embodiment of the inventive concept may perform human body communication in order to perform personal information authentication and pairing. Once pairing or personal information authentication is completed, the transceivers 100 to 300 may transmit/receive a large amount of data by using wireless communication. Additionally, the transceivers 100 to 300 use a human body as an antenna so that they do not include an additional antennal. Accordingly, the sizes of the transceivers 100 to 300 may be reduced, and costs for manufacturing the transceivers 100 to 300 may be reduced also.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A transceiver comprising:
a reception module configured to output a driving signal in response to completion information received from an external device;
a controller configured to output a control signal in response to the driving signal; and
a transmission module configured to communicate with the external device using human body communication by transmitting a first output signal having a first frequency, and to communicate with the external device using wireless communication by transmitting second output signal having a second frequency, the second frequency being different than the first frequency,
wherein the transmission module is further configured to generate a feedback signal by dividing a frequency of the first output signal or of the second output signal based on a first division ratio or a second division ratio and selectively transmit the first or second output signal based on a comparison result, the comparison result being generated by comparing a reference signal and the feedback signal,
wherein the ratio among the first division ratio and the second division ratio used to generate the feedback signal is selected based on the control signal, and
wherein the second division ratio has a smaller value than the first division ratio.

2. The transceiver of claim 1, wherein the transmission module comprises:
a comparator configured to generate a clock signal based on the comparison result;
a charge pump configured to raise or lower the reference voltage based on the clock signal;
an oscillator configured to generate the first or second output signal oscillated in response to the reference voltage outputted from the charge pump; and
a divider configured to generate the feedback signal by dividing a frequency of the first or second output signal generated from the oscillator, based on the first division ratio,
wherein when the divider receives the control signal, the first division ratio of the divider is changed into the second division ratio, and
wherein the divider generates the feedback signal by dividing the frequency of the first or second output signal, based on the second division ratio.

3. The transceiver of claim 1, wherein the transceiver communicates with the external device using human body communication providing the first output signal to the external device using a human body as a communication channel.

4. The transceiver of claim 1, wherein the transceiver communicates with the external device using wireless communication radiating the second output signal outside of a human body.

5. The transceiver of claim 1, wherein the first frequency is lower than the second frequency.

6. The transceiver of claim 1, wherein the transmission module provides one of pairing information and personal authentication information to the external device through the first output signal having the first frequency, and provides data to the external device through the second output signal having the second frequency.

7. The transceiver of claim 6, wherein the completion information is generated in response to one of the pairing information and the personal authentication information.

8. The transceiver of claim 6, further comprising a memory configured to store the pairing information, the personal authentication information, and the data.

9. A transceiver comprising:
a reception module configured to output a driving signal in response to completion information received from an external device;
a controller configured to output a control signal in response to the driving signal; and
a transmission module configured to communicate with the external device through human body communication,
by transmitting a first output signal having a first frequency band to the external device, and to stop transmitting the first output signal and to communicate with the external device through wireless communication when the transmission module receives the control signal from the controller, the second output signal having a second frequency band,
wherein the transmission module comprises a first oscillator configured to generate the first output signal oscillated within the first frequency band and a second oscillator configured to generate the second output signal oscillated within the second frequency band,
wherein the transmission module is further configured to generate a feedback signal by dividing a frequency of the first or second output signal, and to adjust a frequency of the first output signal within the first frequency band and a frequency of the second output signal within the second frequency band based on a comparison result, the comparison result being generated by comparing a reference signal and the feedback signal,
wherein the second frequency band is greater than the first frequency band, and
wherein the transmission module selectively transmits the first output signal outputted from the first oscillator and the second output signal outputted from the second oscillator based on the control signal.

10. The transceiver of claim 9, wherein the transmission module comprises:
a comparator configured to generate a clock signal based on the comparison result;
a charge pump configured to raise or lower the reference voltage based on the clock signal;
a selector configured to connect one of the first oscillator and the second oscillator to the charge pump in response to the control signal; and
a divider configured to generate the feedback signal by dividing a frequency of the first output signal outputted from the first oscillator or the second output signal outputted from one of the first oscillator and the second oscillator based on a division ratio,
wherein the first oscillator and the second oscillator generate the first output signal and second output signal respectively based on the reference voltage outputted from the charge pump.

11. The transceiver of claim 10, wherein the control signal is a first control signal and the controller further outputs a second control signal for controlling the division ratio of the divider.

12. The transceiver of claim 11, wherein
the divider generates the feedback signal by dividing the frequency of the output signal outputted from one of the first oscillator and the second oscillator, based on a first division ratio;
when the divider receives the second control signal, the first division ratio of the divider is changed into a second division ratio; and
the divider generates the feedback signal by dividing the frequency of the output signal outputted from one of the first oscillator and the second oscillator, based on the second division ratio,
wherein the second division ration has a smaller value than the first division ratio.

13. An operating method of a transceiver, the method comprising:
outputting, through a human body by a transmission module of the transceiver, a first output signal having a frequency in a first frequency band to an external device, the first output signal including one of personal authentication information and pairing information, the frequency of the first output signal being adjusted within the first frequency band based on a first comparison result, the first comparison result being generated by comparing a reference signal and a feedback signal for the first output signal;
receiving, by a reception module of the transceiver, completion information generated based on one of the personal authentication information and the pairing information, from the external device;
and
outputting, by the transmission module of the transceiver, a second output signal having a frequency in a second frequency band to the external device, the second output signal being transmitted outside of the human body, the frequency of the second output signal being adjusted within the second frequency band based on a second comparison result, the second comparison result being generated by comparing the reference signal and a feedback signal for the second output signal,
wherein the first frequency band is lower than the second frequency band.

* * * * *